United States Patent Office 3,354,984
Patented Nov. 28, 1967

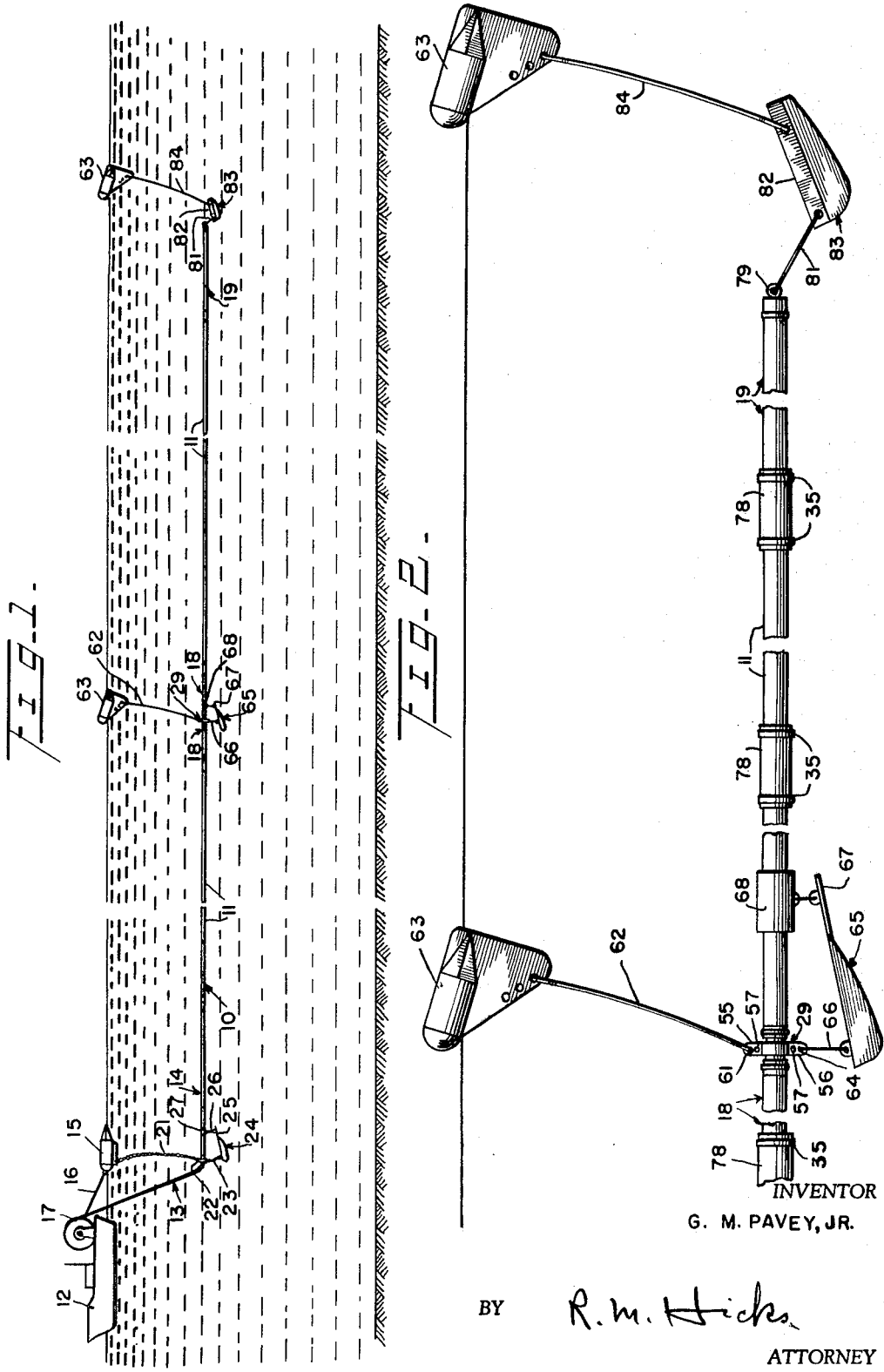

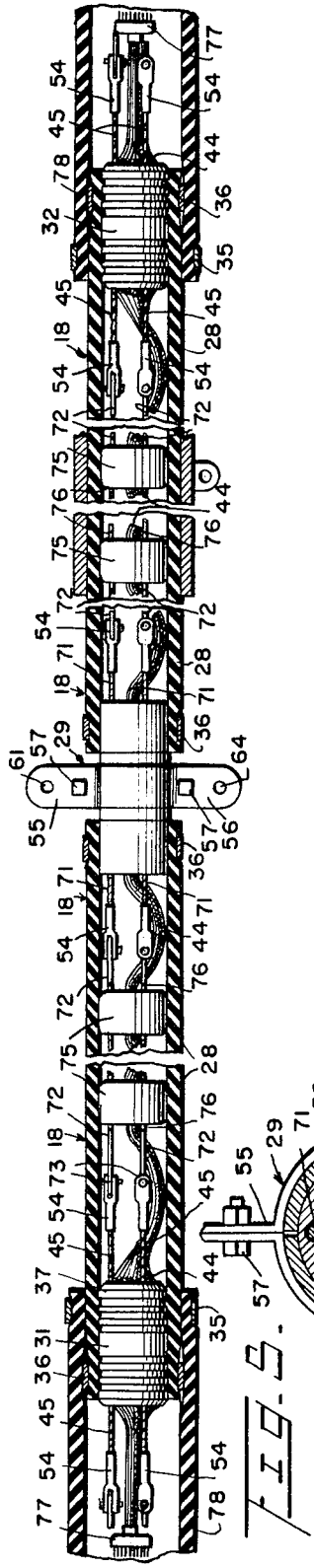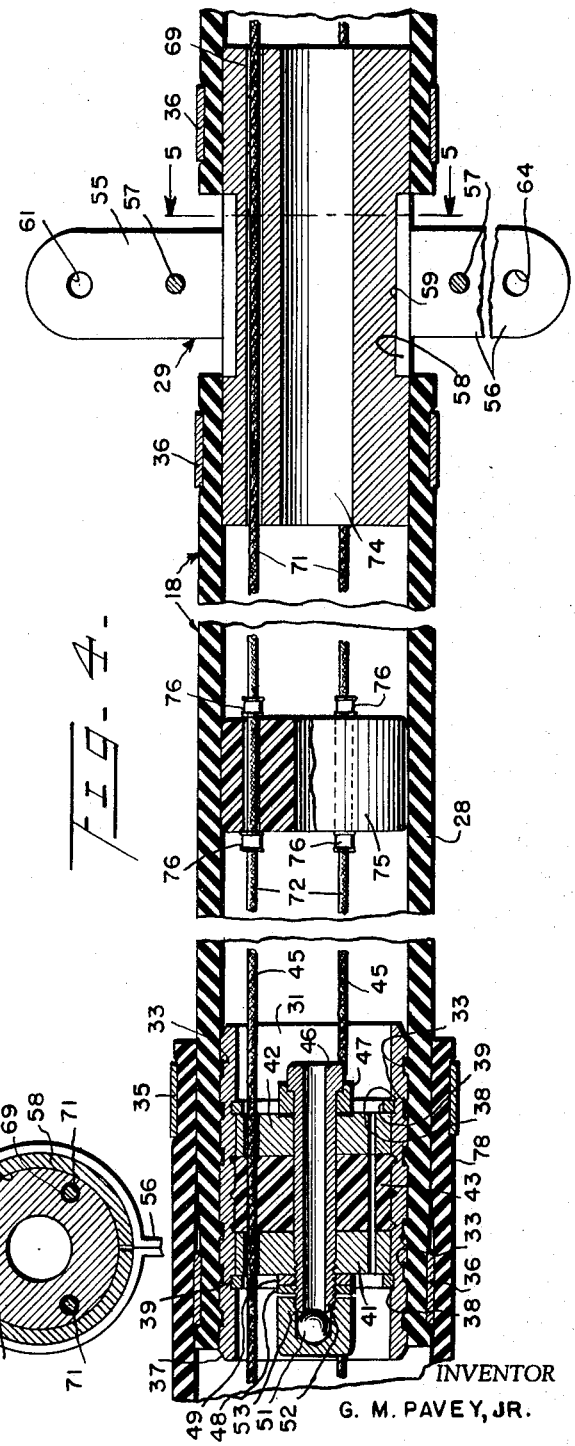

3,354,984
DEPTH CONTROLLED MARINE SEISMIC
DETECTION CABLE
George M. Pavey, Jr., Dallas, Tex., assignor to Whitehall Electronics Corporation, Richardson, Tex.
Filed Aug. 19, 1965, Ser. No. 480,868
9 Claims. (Cl. 181—.5)

ABSTRACT OF THE DISCLOSURE

An elastic oil filled dead section streamer having a plurality of elastic longitudinally extensible plastic strain cables therein and connected at intervals between adjacent sections of a submerged seismic detection streamer containing means for transmitting seismic signals electrically to receiving apparatus on the towing vessel. Each dead section is provided with a float and depressor assembly respectively connected thereto for maintaining the streamer at a constant depth of submersion throughout the length thereof while being towed at a relatively high speed by the vessel. The read section streams also attenuate vibrations from the float and depressor assemblies sufficiently to prevent impairment of the characteristics of seismic signals detected by the detection streamer.

---

This invention relates to apparatus for detecting underwater deposits of oil and more particularly to a system for surveying subaqueous geological formations and exporing oil-retaining subsurface terrestrial structures by seismic signals detected by a plurality of detecting devices disposed within an elongated flexible streamer towed by a vessel continuously at a uniform relatively high rate of speed at a fixed depth beneath the surface of a body of water in which the fixed depth is maintained uniform throughout the length of the streamer by a plurality of streamlined floats secured at intervals to the streamer and the streamer is held at the fixed depth of submersion by depressors corresponding in number to the number of floats and secured to the streamer at the points of connection of the floats thereto and in which means are provided for preventing acoustic pckup of extraneous signals by the detecting devices caused by vibration of the towing cable and the float and depressor assemblies.

In prior systems of this character heretofore devised such, for example, as the system disclosed in Patent No. 2,729,300 for Water Borne Means for Making Seismic Surveys, issued Jan. 3, 1956, to LeRoy C. Paslay et al., it has been the usual practice to receive the seismic signals by a plurality of pressure responsive detectors disposed within an elongated streamer and towed through the water in a submerged condition by a vessel. Although the head end of the streamer was maintained at a predetermined depth during the towing operation by suitable means such as a heavy depressor attached thereto and a length of lead-in or tow cable connecting the head end of the streamer with the towing vessel, it has been found necessary to remove the towing force from the streamer and thereby permit the depressor to sink to the bottom and anchor the streamer as the explosive shot is fired in order to prevent vibrations from the tow cable from being transmitted to the detectors within the streamer while seismic signals are being received.

In my copending application for Elastic Detection Streamer Dead Section for a Water Borne Seismic Surveying System, Ser. No. 464,739, filed June 17, 1965, now Patent No. 3,319,734 issued May 16, 1967, there was disclosed and claimed an elastic dead section comprising an elongated flexible mechanical vibration attenuator interposed between the front or leading end of the detection streamer and the trailing end of the tow cable, a depressor and float being connected to the trailing end of the tow cable somewhat ahead of the leading end of the vibration attenuator to maintain the leading end of the detection streamer at a predetermined depth of submersion while the seismic signals are being received without removing the towing force from the detection streamer.

Although such a system has been found generally satisfactory in service, it does not, however, provide means for maintaining the detection streamer at a predetermined fixed depth of submersion throughout the entire length thereof, particularly in cases where the length of the detection streamer may be about 2700 feet from the head end to the trailing end thereof.

By employing a plurality of streamlined floats and depressors connected at intervals to the detection streamer, the depth of submersion of the streamer along the entire length thereof may be closely controlled. It has been found necessary, heretofore, when employing such a float and depressor arrangement, to remove the towing force from the streamer and thus allow the floats and depressors to come to a substantially rest position within the water to prevent spurious vibrations therefrom from adversely affecting the response of the detecting devices within the detection streamer to seismic signals received thereby.

This problem has been solved in accordance with the teaching of the present invention by employing several lengths of neutrally buoyant detection streamer serially connected by relatively short lengths of neutrally buoyant streamer dead sections, each of the dead sections comprising an elongated flexible mechanical vibration attenuator and having a streamlined float and depressor connected at the midpoint thereof, as will more clearly appear as the description proceeds. When employing a plurality of dead sections in the manner disclosed herein, the entire length of the detection streamer is continuously maintained at a predetermined depth of submersion and satisfactory seismic signals may be received while the streamer is being towed by a vessel at a relatively high rate of speed.

As set forth with greater particularity in my copending application Ser. No. 464,739, filed June 17, 1965, supra, the vibration attenuator takes the form of an oil filled flexible elastic tube or hose section generally similar externally to the detection streamer tubing through which the signal wires extend in a slackened condition for establishing a plurality of electrical connections from the trailing end of each detection streamer section to the signal conductors within the next succeeding streamer section. The vibration attenuator of the present invention differs from the vibration attenuator of my copending application in several important respects. In lieu of a single hose section, the attenuator of the present invention comprises, among other elements, two oil filled hose sections preferably of equal length and interconnected by a metal fitting or coupling member having a pair of diametrically oppositely disposed apertured projections extending outwardly therefrom for establishing an external connection to a streamlined float and to a depressor by a pair of lines respectively connected thereto.

The metal fitting is provided with three equally spaced apertures within which are respectively disposed three strain cables composed preferably of a metal suitable for the purpose and connected at the ends thereof to three elastic strain cables composed of material known in the trade as nylon extending interiorly throughout substantially the combined lengths of both hose sections for establishing an elastic towing connection between the strain cables of a pair of detection streamer sections connected respectively thereto. By connecting a float and depressor to the metal fitting, substantially as shown, an elastic connection is provided between the ends of the adjacent streamer sections and the float and depressor assembly secured to the fitting whereby fortuitous vibrations received by the fitting from the float and depressor connected thereto are attenuated sufficiently while the detection streamer is towed at a high rate of speed, to prevent these vibrations from adversely affecting the seismic sensing devices within the detection streamer sections. The fitting is also provided with a longitudinal aperture of sufficient size to allow the signal conductors to pass freely therethrough.

One of the objects of the present invention is to provide a new and improved seismic surveying system in which the seismic signals are detected by a plurality of seismic sensing devices disposed within an elongated submerged flexible detection streamer having a plurality of stream lined floats and depressors connected thereto at intervals for maintaining a fixed depth of submergence throughout the length of the streamer in which novel means are employed for attenuating vibrations received from the lines connecting the floats and depressors to the submerged detection streamer while being towed continuously at a uniform high rate of speed through the water by a moving vessel.

Another of the objects is to provide a plurality of new and improved float and depressor means connected at intervals to a seismic signal detection streamer for maintaining the streamer at a predetermined fixed depth of submersion throughout the length thereof when towed at a relatively high rate of speed through the water by a moving vessel and for effecting attenuation of the vibrations from the floats and depressors received from the lines respectively connected thereto sufficiently to prevent the vibrations from adversely affecting the sensing devices within the streamer while the streamer is being towed at the high rate of speed.

Still another object is the provision of a new and improved elastic dead section for effecting a towing connection to a plurality of streamlined floats and depressors connected at intervals along a submerged elongated flexible detection streamer in which vibrations transmitted by the lines connecting the floats and depressors to the streamer are prevented from adversely affecting the operation of a plurality of seismic sensing devices disposed within the detection streamer while the streamer is being towed continuously in a submerged condition by a moving vessel at a uniform depth throughout the length of the streamer and at a relatively high rate of speed.

Still another object is the provision of a new and improved mechanical vibration attenuator for establishing a towing connection between an elongated flexible detection streamer and a plurality of floats and depressors connected at intervals thereto for maintaining the streamer at a constant depth of submersion while being towed at a relatively high rate of speed by a moving vessel whereby seismic signals may be received without being adversely affected by vibrations from the lines connecting the floats and depressors to the streamer.

Still another object is the provision of a new and improved vibration attenuator for a seismic surveying system which is economical to manufacture, reliable in operation, durable in service, and which possesses all the advantages of ruggedness and high efficiency for the purpose intended.

Still other objects, advantages and improvements will be apparent from the following description, taken in connection with the following drawings, of which:

FIG. 1 is a diagrammatic view of the present invention in accordance with a preferred embodiment thereof;

FIG. 2 is a view somewhat enlarged and partially broken away of the mechanical vibration attenuator device secured at an intermediate portion of the detection streamer and to the trailing end of the detection streamer respectively, both devices having a float and depressor connected thereto;

FIG. 3 is an enlarged elevational view and partially in section of one of the intermediate attenuator devices of the present invention coupled between a pair of adjacent detection streamer sections with the float and depressor removed therefrom;

FIG. 4 is a greatly enlarged sectional view, partially broken away of an end portion of the attenuator of FIG. 3 with a coupling hose connected thereto and the signal wires removed, and FIG. 5 is a view taken along the line 5—5 of FIG. 4.

Referring now to the drawings on which like numerals of reference are employed to designate like parts throughout the several views for a more complete understanding of the invention, and more particularly to FIG. 1 thereof, there is shown thereon in diagrammatic form a preferred embodiment of the system of the present invention, the system comprising a detection streamer indicated generally by the reference numeral 10 and composed of a plurality of oil filled detecting sections 11, towed at a uniform relatively high rate of speed by a vessel 12, at a constant depth of submersion throughout the length thereof within the water. The streamer is provided with a lead-in or tow cable generally indicated by the numeral 13 employed for establishing a towing connection to the vessel. The trailing end of the tow cable is secured to the leading end of a neutrally buoyant mechanical noise attenuator or elastic dead section generally indicated at 14, the other end of the dead section being secured to the foremost section 11 of the detection streamer 10.

There is also provided a float 15 towed by a length of line 16 secured at the aft end of the vessel. A reel 17 is also provided on the vessel for paying out the detection streamer which comprises a dead section 18 secured to the trailing end thereof, a plurality of seismic signal detecting sections 11 connected in serial order by a plurality of dead sections or vibration attenuators 18, the trailing end of the rearmost section 11 of the detection streamer being connected to dead section 19 as shown.

A chain or length of line 21 preferably of stainless steel connects the float 15 to a collar 22 within which is disposed the trailing end portion of the tow cable 13. The collar is provided with a downwardly projecting member having an aperture therein for effecting a connection to a bridle to support a heavy depressor 24 within the water. The collar is preferably of two piece construction held together by bolts, rivets or the like to facilitate connection to the tow cable. The depressor which may, for example, weigh 300 pounds, is provided with a trailing end portion 25 suspended by a line or chain 26 secured at one end thereof to a collar 27 encircling the tow cable 13 thereby providing an arrangement whereby the leading end of the first dead section 14 of the streamer is towed at a predetermined depth controlled by the length of chain 21.

The tow cable comprises a length of flexible tubing such as a gasoline hose within which is disposed a relatively large strain cable connected at the trailing end thereof to a spider to which three equally spaced strain cables are attached. These three strain cables are respectively connected to three complementary strain cables extending through the oil filled dead section 14 and at the trailing ends thereof are connected to three relatively short lengths of metallic strain cables passing through a packing box at the rear end of the dead section to effect an oil tight seal therebetween. The signal conductors pass through this dead section streamer in a slack condition and are provided with a muticontact plug and jack arrangement at the ends thereof for effecting a plurality of electrical connections between the detecting devices and the recording apparatus on board the vessel. Since the foregoing dead section 14 and the connections therefrom to the vessel do not present form an important part of the present invention, a further description of the details thereof is deemed unnecessary, particularly since many of the structural details thereof are similar in many respects to the noise attenuator disclosed in FIGS. 2–4 and should be clearly apparent after undestanding the description of these figures.

Referring now particularly to FIG. 3 on which is shown a noise attenuator according to one embodiment of the present invention, the device comprises two preferably equal lengths of oil filled polyvinyl tubing 28 each clamped at one end thereof to a fitting 29 as by the clamps 36 and at the other end to a packing box 31 and a similar packing box 32. If desired the fitting 28 may be provided with a plurality of annular grooves about the outer cylindrical surface thereof to insure an oiltight connection with the pair of tubular members 28 clamped thereto. The packing box 31 is of generally cylindrical configuration composed preferably of aluminum and provided with a plurality of annular grooves 33 formed exteriorally thereon for effecting an oiltight seal with the outer tubular member 28 of the dead section streamer section 18 when hose 78 is placed thereover and clamped by the clamp 35, which like the other hose clamps described and illustrated herein including hose clamp 36 which is employed to seal the tubing 28 to the packing box prior to filling the dead section with oil, may be of any type suitable for the purpose such, for example, as a type known in the trade as a Punch-Lock clamp.

The packing box comprises a tubular sleeve 37, having a plurality of annular grooves 38 formed therein to receive and retain a pair of keeper rings 39 of the spring lock type respectively disposed therein.

Abutting each keeper ring respectively are a pair of phenolic spacer elements 41–42 adapted to compress a phenolic seal 43 composed of material suitable for the purpose such, for example, as neoprene sufficiently to force the seal into sealing engagement with the inner cylindrical surface of sleeve 37 and seal the signal conductors 44, FIG. 3, and strain cables 45 within the packing box. Each of the spacer elements 41–42 and the seal member 43 is provided with suitable apertures through which the signal conductors and metallic strain cables 45 extend.

A tubular bolt 46 having a locking member 47 configured to seize the head thereof, and preferably doweled to the spacer element 42, is assembled beneath the head of the bolt and the spacer element to prevent rotation of the bolt as nut 48 is tightened. A washer 49 is preferably assembled between nut 48 and the front spacer element 41. Tightening nuts 48 compresses neoprene seal 43 into fluid tight engagement with the bolt in addition to effecting a sealing connection with the strain cables and conductors.

Prior to use in service the streamer section is filled with oil by attaching an oil fitting to the hollow bolt 46. When the dead section streamer is filled with oil a steel ball 51 is placed on a tapered seat 52 formed within the bolt. Cap nut 53 is now threaded on the bolt and tightened sufficiently to draw the ball into firm sealing engagement with the seat and thereby seal the oil within the dead section of the streamer.

The opposite end of the streamer is provided with a similar packing box 32 constructed and arranged to seal the trailing end of the dead section streamer and the signal wires and strain cables 45 extending therethrough. If desired, a solid bolt may be employed to clamp the parts together in lieu of the hollow bolt 46 whereby the dead section of the streamer is invariably filled from the forward end. The groups of metallic strain cables 45 extending from the opposite ends of the dead section streamer are provided with clevis type connectors 54 at the inner and outer ends thereof and are of a length just sufficient to extend in both directions through their respective packing boxes and to facilitate a connection with the strain cables secured thereto.

As best shown in FIG. 4 the fitting 29 comprises a generally tubular section having an upwardly extending strap member 55 and a diametrically opposite strap member 56 extending downwardly therefrom. The strap members 55–56 are preferably of two piece constuction clamped together with bolts 57 and encircling a two piece bearing member 58 to which the strap members are secured. The bearing member 58 is arranged within an annular recess formed within the tubular section of the fitting when the parts are clamped together by the bolts 57. Strap 55 is provided with an eye or aperture 61 to which is secured one end of a line 62 having a stream lined float 63 secured to the opposite end thereof substantially as shown, FIG. 2.

The lower strap member 56 is provided with an eye or aperture 64 to which is secured a streamlined depressor 65 as by a relatively short length of line or bridle 66. The depressor is provided with a rearwardly extending portion 67 secured to a sleeve 68 encircling tubing member 28 substantially as shown. The fitting 29 and lines connected thereto may be made of metal suitable for the purpose such, for example, as stainless steel. An arrangement is thus provided in which both the float 63 and depressor 65 are towed through the water by a towing force applied to the head end of the detection streamer.

Referring now to FIGS. 2 and 3 the cylindrical or sleeve portion of the fitting 29 is provided with three equally spaced apertures 69 within which are respectively disposed three relatively short lengths of metallic strain cable 71 having a clevis type connector 54 connected respectively to each end thereof. The inner ends of strain cables 45 are connected to a plurality of strain cables 72 extending substantially the length of the vibration attenuator dead section 14 and composed preferably of nylon, the connections being established preferably by splicing the ends of the nylon cables 72 in a manner to form a loop encircling a pin or bolt passing through the aligned apertures in the clevis member 73 substantially as shown.

The opposite ends of the nylon strain cables 72 are connected in a similar manner to the respective ends of the metallic strain cables 71 passing through the fitting 29. The fitting 29 is also provided with an elongated bore or aperture 74 extending therethrough within which the signal conductors are disposed. The tubing 28 is composed of a plastic material suitable for the purpose such, for example, as polyvinyl chloride and when provided with longitudinally extensible elastic strain cables composed of nylon or the like extending substantially throughout the length thereof and connected to the adjacent detection streamers, provides an arrangement in which vibrations received from the floats and depressors while the streamer is being towed at a predetermined depth of submersion such, for example, as thirty five feet are prevented from adversely affecting the seismic detectors within the detection streamer.

There is also provided a plurality of spacing elements 75 composed preferably of plastic such, for example, as Lucite, arranged at intervals along the dead section streamer, each spacer having three equally spaced apertures extending longitudinally therethrough within which the strain cables 72 are respectively disposed and a central aperture encircling the signal conductors 44. A plurality of stop members 76 composed preferably of copper and to which a tin finish has been applied are carried by the strain cables 72 on opposite ends of each of the spacers 75, the stop members being compressed inwardly against their respective cables at a central portion thereof sufficiently to prevent axial movement along the strain cables and retain the spacers in predetermined positions therealong.

The signal conductors 44 are loosely contained within the dead section streamer and exceed the length of the streamer by approximately thirty percent. Thus a dead section streamer having a length of 100 feet, for example, would carry signal wires each having a length of about 130 feet. A convenient manner of distributing this additional length of signal conductor wires along the length of the streamer may be achieved by folding a relatively short length of conductor wires back upon itself at intervals between a respective pair of adjacent spacers during the assembly of the dead section and retaining the folded portion by one or more elastic rubber bands. After the section has been filled with oil, the rubber bands are rotted or dissolved by the action of the oil thereby releasing the folds and permitting the wires to assume a loose relaxed position within the dead section streamer.

When the strain cables within the dead section have been connected to the corresponding strain cables of the adjacent detection streamer and the multiconductor plug 77 has been inserted into the complementary multicontact jack extending from the detection streamer, a short length of coupling hose 78 is clamped to the end portions of the dead section and the adjacent detection streamer. During the clamping operation, a thin oil tube having a flattened end portion is inserted beneath the coupling hose 78 and the coupling hose is filled with oil, after which the oil tube is withdrawn and the clamping operation is completed.

The manner in which the last trailing float and depressor are connected to the trailing end of the last section of the detection streamer differs somewhat from the noise attenuator dead section arrangement just described and will best be understood by reference to FIG. 2 on which is shown a dead section 19 connected by coupling member 78 to the trailing end of the last detection streamer section. The dead section 19 is generally similar to the dead section 18 but differs therefrom in the manner of connection of the streamlined float and depressor thereto. Dead section 19 does not employ a fitting at a mid portion thereof such as the fitting 29 but in lieu thereof the trailing end of the dead section is provided with an eye bolt 79, FIG. 2, to which is secured as by the line 81 an upstanding fin 82 of a depressor 83. A float 63 is connected as by line 84 to the depressor 83 in the manner indicated. The lines 21, 62 and 84 are adjusted to provide the depth of submersion desired for the detection streamer such, for example, as 35 feet, while being towed at a relatively high rate of speed through the water. Furthermore, while the weight of the depressor 24 may be about 300 pounds, a depressor having a weight of approximately 40 pounds has been found to give satisfactory service for the depressors 65 and 83. It is also to be understood that although a single float and depressor has been illustrated as connected to an intermediate portion of the detection streamer, if desired, additional float and depressor arrangements may be connected at intervals to the detection streamer in accordance with the teaching of this invention and furthermore the detection streamer may be towed at different depths of submersion and the weights of the depressors employed with this invention may assume different values from the weights given in acceleration, or velocity, for example.

Although the invention has been described with particular reference to a detection streamer having a plurality of pressure responsive detection devices therein it is also suitable for other types of detection streamer employing hydrophones responsive to other characteristics of the reflected seismic acoustic wave such as particle acceleration, or velocity, for example.

Whereas the invention has been described with particular reference to a preferred embodiment thereof which gives satisfactory results, it will be understood by those skilled in the art to which the invention pertains, after understanding the invention, the various changes and modifications may be employed without departing from the spirit and scope of the invention and it is my intention, therefore, in the appended claims to cover all such changes.

What I claim as new and desire to secure by Letters Patent of the United States is:

1. A waterborne seismic prospecting system for subaqueous geological structures comprising, in combination,
  (1) an oil filled flexible elongated neutrally buoyant detector streamer comprising a plurality of discrete detection streamer sections serially connected and adapted to be towed by a vessel at a uniformly high rate of speed beneath the surface of a body of water, each of said sections having a plurality of seismic detecting devices therein,
  (2) a lead-in tow cable secured to the vessel for towing the streamer through the water,
  (3) longitudinally extensible elastic yieldable means interconnecting the trailing end of said tow cable with the leading end of said detection streamer for preventing vibrations from the tow cable from adversely affecting said detecting devices while the streamer is towed through the water at a high rate of speed,
  (4) and additional longitudinally extensible elastic means interconnecting the adjacent trailing and leading ends respectively of at least one pair of said detection streamer sections intermediate the head and trailing sections of said streamer for maintaining the streamer at a predetermined depth of submersion at the interconnected sections, said elastic interconnecting means comprising,
  (5) a fitting sealed to a pair of oil filled hose members secured thereto and having a plurality of equally spaced bores extending longitudinally therethrough,
  (6) means for establishing a longitudinally extensible elastic towing connection from the outer ends of said hose members to the end portions of a pair of detection streamer sections adjacent thereto,
  (7) a depressor connected to said fitting,
  (8) a streamlined float secured to said fitting and towed thereby in a position directly above the depressor, and
  (9) means including a plurality of longitudinally extensible elastic strain cables extending interiorly throughout substantially the combined lengths of both members for preventing vibrations from the interconnected float and depressor from adversely affecting the response of the detection streamer to seismic signals reflected upwardly from a subaqueous geological formation while the detection streamer is towed at a fixed depth throughout the length thereof and at a relatively high rate of speed within the water.

2. A seismic prospecting system according to claim 1 in which said elastic strain cables are each composed of a plastic having the characteristics of nylon and of a length substntially equal to the length of each hose member including,
  (1) a plurality of relatively short lengths of flexible strain cables composed of metal disposed respectively within each of said bores and,
  (2) means interconnecting the end portions of said short lengths of strain cables to the end portions of said elastaic strain cables respectively adjacent thereto.

3. A seismic prospecting system according to claim 2 including,
  (1) an elastic dead section streamer connected to the trailing end of said detection streamer,
  (2) a depressor connected to the trailing end of said dead section streamer, and
  (3) a streamlined float connected by a length of line to said last named depressor for maintaining the trailing end of said dead section streamer at a predetermined depth of submersion corresponding to the depth of submersion of said fitting while the detection streamer is being towed at a relatively high rate of speed.

4. An elastic dead section oil filled streamer having a streamlined float and depressor connected thereto for use with a waterborne seismic surveying system comprising an elongated flexible detection streamer adapted to be towed continuously at a high rate of speed by a moving vessel, said flexible detection streamer comprising, (1) a plurality of discrete serially connected streamer sections each having a plurality of seismic detecting devices and signal conductors therein and a plurality of strain cables extending longitudinally therethrough for establishing a towing connection to each of the streamer sections, (2) a plurality of dead section streamers interconnected at intervals between the end portions of an adjacent pair of detection streamer sections, (3) a fitting having a pair of oppositely disposed cylindrical portions with a plurality of equally spaced bores and a central bore extending therethrough, (4) a pair of flexible oil filled elongated tubing members clamped in oil tight relation to said cylindrical portions, (5) a pair of plug members each sealing a respective outer end of said tubing members.

(6) a plurality of relatively short lengths of metallic strain cables extending through each of said plug members in oil tight sealed relation therewith and provided with means at the outer ends thereof for effecting a towing connection between the strain cables of an adjacent pair of signal detection streamer sections, (7) a plurality of equally spaced elastic strain cables having the characteristics of nylon disposed within each of said tubing members throughout substantially the length thereof and respectively connected to the inner ends of said short lengths of metallic strain cables, (8) a plurality of additional metallic strain cables disposed respectively within said equally spaced bores within said fitting and respectively interconnecting the inner end portions of said elastic strain cables within each of said elongated tubing members, (9) a plurality of spacer members arranged in predetermined positions at regular intervals within said elongated tubing members, each spacer member being provided with equally spaced apertures through which the plastic strain cables are disposed and an additional central aperture,

(10) each of said plastic strain cables having a plurality of stop members secured thereto in a manner to prevent axial movement of the spacer members from the predetermined positions, and

(11) means on said fitting for connecting a streamlined float and a depressor thereto in a manner to maintain the dead section and detection streamers serially connected thereto at a predetermined depth of submersion while the detection streamer is being towed at a high rate of speed by a moving vessel.

5. An elastic dead section streamer according to claim 4 including, (1) a plurality of signal conductors disposed in a slack condition within the central aperture of each of said spacer members and said fitting and extending through each of said plug members in sealed relation therewith and having means at the ends thereof for establishing a plurality of electrical connections between the sections of the detection streamer connected immediately adjacent thereto.

6. In an oil filled elongated detector streamer system for detecting seismic signals reflected upwardly from sub-bottom geological structures while the streamer is continuously towed submerged at a predetermined depth throughout the length thereof at a high rate of speed through the water, in combination, (1) an oil filled neutrally buoyant detection streamer comprising a plurality of serially connected streamer sections, each having a plurality of seismic detecting devices therein, (2) means for towing said streamer at a uniform depth of submersion throughout the length thereof and at a high rate of speed while seismic signals are received thereby, (3) means including a plurality of streamlined float and depressor assemblies connected at intervals to the streamer throughout the length thereof for maintaining the streamer at said predetermined depth of submersion, (4) said last named means each including an elastic longitudinally extensible dead section interconnecting the streamlined float and depressor assemblies with the streamer sections for attenuating vibrations from the float and depressor assemblies sufficiently to prevent impairment of the reception of seismic signals by said seismic detecting devices while the detection streamer is towed through the water at a high rate of speed, (5) said vibration attenuating means including a plurality of elastic longitudinally extensible strain members composed of a plastic possessing the characteristics of nylon disposed longitudinally within said dead section and connected at the adjacent end portions of a pair of streamer sections, (6) and means including a fitting clamped to the mid-portion of each of said dead sections for establishing a pair of towing line connections to the streamlined float and depressor respectively connected thereto whereby the streamlined float and depressor are towed through the water by the fitting.

7. An elongated neutrally buoyant detection streamer comprising a plurality of discrete serially connected detection sections each having a plurality of seismic sensing devices therein for detecting seismic signals reflected upwardly through the body of water within which the streamer is submerged, (1) means for towing the streamer through the water continuously at a high rate of speed, (2) a plurality of streamlined float and depressor assemblies connected to the ends of the streamer and at intervals along the length thereof to maintain the streamer at a predetermined depth of submersion throughout the length thereof while the streamer is being towed by said towing means, and (3) longitudinally extensible elastic means interconnecting each of the float and depressor assemblies with the streamer for preventing vibrations from the assemblies from adversely affecting reception of the seismic signals by said seismic sensing devices while the streamer is being towed at the high rate of speed, (4) said longitudinally extensible elastic means comprising a plurality of oil filled tubular dead sections each having (a) a plurality of equally spaced longitudinally extensible strain cables extending interiorly throughout substantially the length of each of said dead sections, (b) means including a plurality of non-extensible strain cable members connected respectively to the ends of the longitudinally extensible strain cables and yieldably sealed in oiltight relation to the opposite ends of said dead sections for establishing a noise attenuating towing connection at intervals along the streamer, and (5) means including a fitting clamped to the mid portion of each of said dead sections for establishing a pair of towing line connections to the float and depressor respectively connected thereto and towed continuously through the water thereby at a high rate of speed.

8. A noise attenuator for use with a seismic prospecting system comprising a detection streamer having a plurality of flexible elongated neutrally buoyant detection streamer sections and a plurality of streamlined float and depressor assemblies connected thereto at intervals intermediate an adjacent pair of streamer sections for maintaining the streamer continuously at a predetermined depth of submersion while the streamer is being towed continuously at a high rate of speed, comprising (1) an oil filled flexible tubular member having an apertured fitting connected thereto at the mid point thereof,
(2) means on said fitting for connecting a pair of lines to a streamlined float and depressor respectively thereto,
(3) a pair of plug members sealing the ends of said flexible tubular member,
(4) means including a plurality of short lengths of strain cables extending through each of said plug members respectively in sealed relation therewith for effecting a towing connection between the adjacent streamer sections and the noise attenuator,
(5) a plurality of longitudinally extensible elastic strain cables disposed within said tubular member and respectively connected to the inner ends of the short lengths of strain cables, and
(6) means disposed within the apertures of said fitting interconnecting the inner ends of said elastic strain cables in such manner that vibrations from the float and depressor assembly during the towing of the streamer at said high rate of speed and transmitted to said fitting are attenuated sufficiently to prevent impairment of the characteristics of seismic signals detected by said detection streamer.

9. A noise attenuator according to claim 8 comprising,
(1) means including a plurality of electrical conductors extending interiorly and loosely throughout the length of the noise attenuator and outwardly through said plug members in sealed relation therewith for effecting a plurality of external electrical connections between the signal conductors of the detection streamer sections connected thereto.

References Cited

UNITED STATES PATENTS

| | | | |
|---|---|---|---|
| 793,896 | 7/1905 | Mundy | 34—7 |
| 2,465,696 | 3/1949 | Paslay | 181—.5 |
| 2,607,842 | 8/1952 | Reid | 340—7 |
| 2,652,550 | 9/1953 | Lash | 340—7 |
| 3,290,645 | 12/1966 | Pavey et al. | 340—7 |
| 3,319,734 | 5/1967 | Pavey | 181—.5 |

BENJAMIN A. BORCHELT, *Primary Examiner.*

W. KUJAWA, *Assistant Examiner.*